(No Model.)
E. A. JONES.
BALL BEARING FOR VEHICLE WHEELS.
No. 502,927. Patented Aug. 8, 1893.
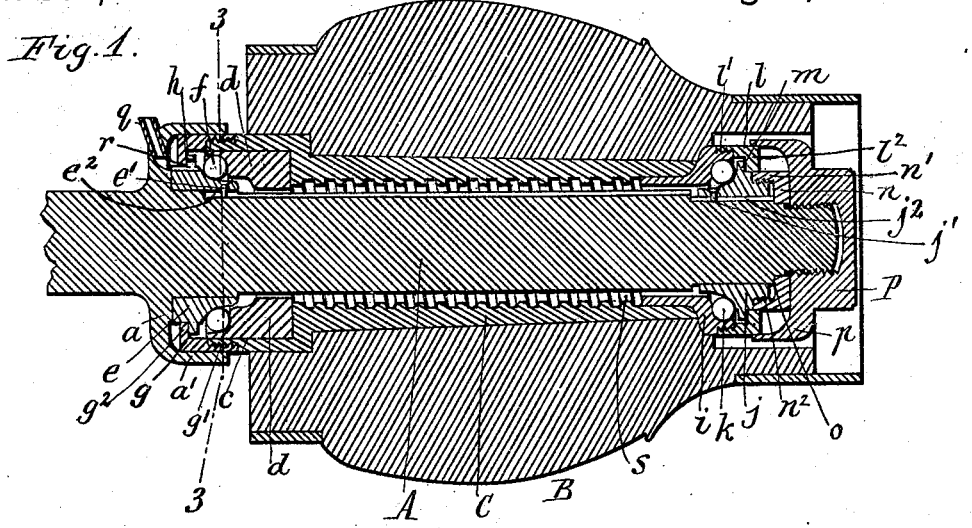
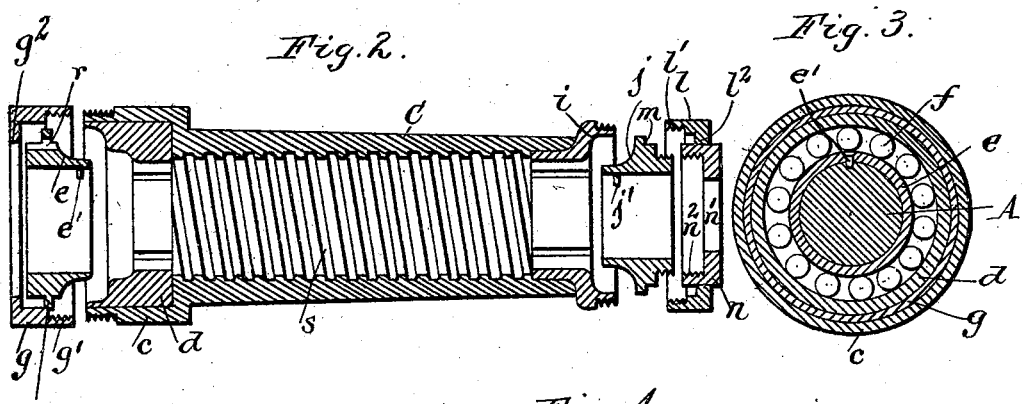
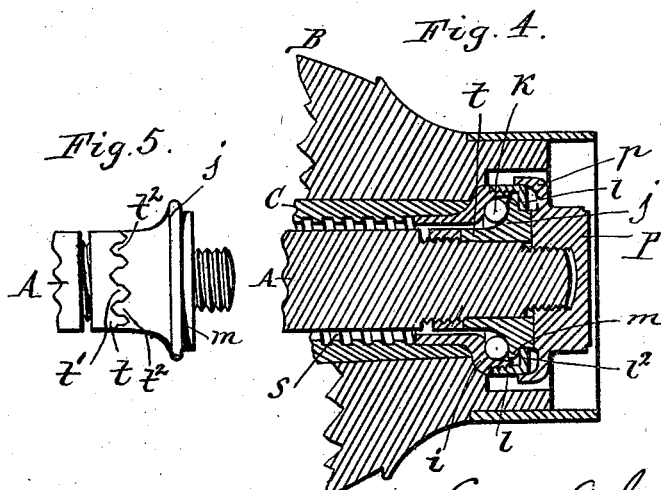
Witnesses:
Chas. F. Burkhardt
Theo. L. Popp
Edward A. Jones Inventor
By Wilhelm Bonner
Attorneys.

UNITED STATES PATENT OFFICE.

EDWARD A. JONES, OF TONAWANDA, NEW YORK.

BALL-BEARING FOR VEHICLE-WHEELS.

SPECIFICATION forming part of Letters Patent No. 502,927, dated August 8, 1893.

Application filed February 16, 1893. Serial No. 462,573. (No model.)

*To all whom it may concern:*

Be it known that I, EDWARD A. JONES, a citizen of the United States, residing at Tonawanda, in the county of Erie and State of New York, have invented new and useful Improvements in Ball-Bearings for Vehicle-Wheels, of which the following is a specification.

This invention relates to ball bearings for vehicle wheels which permit the bearings to be removed from the axle spindle with the wheels without disturbing the balls.

My invention has for its objects to produce a bearing of simple construction which can be readily adjusted to take up wear and to provide efficient means for oiling the bearings.

In the accompanying drawings, Figure 1 is a longitudinal central section of a wheel hub and axle spindle provided with my improved bearings. Fig. 2 is a detached longitudinal section of the axle box and connecting parts showing the parts separated. Fig. 3 is a cross section in line 3—3, Fig. 1. Fig. 4 is a fragmentary longitudinal section of the wheel hub and adjacent parts showing a modified construction of the adjusting device of the bearings. Fig. 5, is a fragmentary side elevation of the outer cone of said bearing and its adjusting nut.

Like letters of reference refer to like parts in the several figures.

A represents the axle spindle having at its inner end a collar or shoulder $a$ which is preferably provided with an outwardly-extending annular flange $a'$ forming a dust cap or shield.

B is the wheel hub and C a sleeve or axle box secured within the bore of the hub and provided at its inner end with an annular enlargement or chamber $c$ which extends beyond the inner end of the hub.

$d$ is an inner cone or bearing ring secured within the chamber $c$ of the axle box and provided with the usual annular ball groove. This cone is provided with a central opening for the passage of the axle spindle.

$e$ is an outer cone or bearing surrounding the spindle and facing the adjacent cone $d$. This cone is also provided with a ball groove, between which and the groove of the opposing cone, the anti-friction balls $f$ are interposed. The outer cone $e$ is provided in its bore with an inwardly projecting pin $e'$ which enters a longitudinal groove or feather way $e^2$ formed in the periphery of the axle spindle. This pin permits the cone to slide lengthwise on the spindle, toward and from the opposing cone, but prevents it from turning on the spindle.

$g$ is a retaining ring whereby the outer cone is connected with the chamber $c$ of the axle box, so as to maintain its proper position with reference to the inner cone and retain the balls in place when the wheel is removed from the axle spindle. This retaining ring is provided in its front portion with an internal screw thread $g'$ which engages with an external thread formed on the adjacent portion of the axle box, and is formed at its rear edge with an inwardly projecting annular flange $g^2$ which overlaps an annular rim or shoulder $h$ formed on the outer cone $e$, whereby the latter is prevented from moving away from the opposing inner cone. The cap $a'$ of the axle spindle incloses the retaining ring $g$ and thus excludes dust from the bearing. The inner and outer cones $d$ and $e$ and the intervening balls constitute the inner bearing of the wheel.

$i$ is an inner cone secured to the outer end of the axle box or sleeve C and forming a part of the outer bearing of the wheel. This cone surrounds the axle spindle and is provided in its outer end with a ball groove. $j$ is the outer cone of said bearing which also surrounds the spindle and is provided with a ball groove, and $k$ are the balls running in the channel formed by the two cones. The outer cone $j$ is free to slide lengthwise on the axle spindle, but is held against turning on the same by a radial pin or feather $j'$ secured within the bore of the cone and entering a longitudinal featherway $j^2$ formed in the outer portion of the axle spindle.

$l$ is a retaining ring similar to the ring $g$ whereby the outer cone $j$ is connected with the inner cone $i$ so as to confine the balls between the cones when the wheel is removed from the spindle. This retaining ring is provided in its inner portion with an internal screw thread $l'$ which engages with an external thread formed on the outer end of the inner cone and at its outer end with an inwardly extending flange $l^2$ which overlaps an annular rim or shoulder $m$ formed on the outer cone, whereby the latter is connected with the inner cone.

$n$ is an adjusting nut or collar surrounding the axle spindle on the outer side of the outer cone $j$ and provided with a rearwardly-extending marginal rim $n'$, having an internal screw thread $n^2$ which engages with an external thread formed on the adjacent contracted neck of the outer cone. The adjusting nut $n$ abuts against an annular shoulder $o$ formed near the outer end of the axle spindle.

P is a jam or lock nut applied to the screw threaded outer end of the axle spindle and bearing against the outer side of the adjusting nut $n$, so as to hold the latter against turning after being adjusted. This lock nut is preferably formed with an inwardly extending rim or cap $p$ which overlaps the retaining ring $l$ and renders the bearing dust-proof.

In order to take up any wear of the bearings, the lock nut P is removed from the spindle and the adjusting nut $n$ is then turned in the proper direction to diminish the distance between the cones $i$ and $j$ of the outer ball bearing. As the outer cone is held against turning on the axle spindle, its screw connection with the adjusting nut compels it to move toward the inner cone upon turning the adjusting nut. Upon again applying the lock nut to the spindle the adjusting nut is clamped against the shoulder $o$ of the spindle and in thus moving the outer cone toward the inner cone, the inner cone $d$ of the inner wheel bearing is at the same time shifted a corresponding distance toward the outer cone $e$ of said bearing through the sleeve C thus adjusting both wheel bearings simultaneously. The wheel is readily removed from the spindle, by removing the lock nut P, when the wheel may be withdrawn without disturbing its bearing cones or balls. The feather way $e^2$ extends to the outer end of the enlarged portion of the axle spindle, as shown in Fig. 1. In replacing the wheel, the said outer cone is turned to bring its pin into register with said feather way. The pin of the corresponding cone of the outer wheel-bearing is likewise brought into coincidence with its feather way $j^2$ in slipping the wheel upon the spindle.

$q$ is an oil supply tube or nozzle applied to the cap $a'$ of the axle spindle and opening at its lower end into the cap. The oil passes from the cap to the inner wheel bearing through a passage $r$ extending through the adjacent cone $e$. From this bearing the oil passes outward through the annular space between the inner cone $d$ and the axle spindle and into the axle box or sleeve C, and from the latter to the outer wheel bearing through the annular space between the inner cone of said bearing and the axle spindle. To permit the oil to thus pass from the inner to the outer wheel bearing, the inner cones of the two bearings are made of somewhat larger diameter than the spindle as shown in Fig. 1, to form the necessary passages. In order to insure the feeding of the oil to the outer wheel bearing, the axle box or tube is provided internally with a spiral groove $s$ which trends outwardly and which causes the oil to be propelled toward the outer bearing as the wheel turns. This feed groove is preferably formed by screw threading the bore of the axle box, as shown. Oil is thus fed to both bearings of the wheel by supplying only the inner bearing.

In the modified construction of the ball bearing, shown in Figs. 4 and 5, an adjusting nut $t$ is arranged on the inner side of the outer cone $j$ instead of on the outer side thereof, as in the first described construction. This adjusting nut engages with the external thread upon the outer contracted portion of the axle spindle, and is provided on its outer edge with teeth or serrations $t'$ which interlock with similar teeth $t^2$ formed on the contiguous edge of the outer cone so that upon turning the cone on the spindle the nut is compelled to turn with it. The lock nut clamps the outer cone against the adjustable nut and the latter forms an adjustable stop which limits the inward movement of the outer cone. In adjusting the bearing to compensate for wear, the lock nut is removed from the axle spindle and the cone is turned to properly adjust the stop nut, and after effecting the adjustment, the lock nut is again replaced. In the drawings the fixed cones of the wheel bearings are shown separate from the axle box, but they may be cast or otherwise formed in one piece with the same if desired.

I claim as my invention—

1. In a ball bearing for vehicle wheels, the combination with the sleeve or axle box, of a fixed cone arranged at one end of the axle box, an opposing adjustable cone capable of sliding on the axle spindle toward and from the fixed cone, but held against turning thereon, a ring connecting the two cones, whereby the adjustable cone is retained in place when the axle box is removed from the spindle, and an adjusting nut connected with the sliding cone, for adjusting the latter relatively to the fixed cone, substantially as set forth.

2. In a ball bearing for vehicle wheels, the combination, with the axle spindle having a longitudinal groove, of the axle box having a fixed cone at one end, an opposing adjustable cone sliding on the axle spindle and having a screw thread and a projection engaging in the groove of the spindle, an adjusting nut engaging with the screw thread of the sliding cone and a lock nut for retaining the parts on the spindle, substantially as set forth.

3. In a ball bearing for vehicle wheels, the combination with the axle box carrying an inner cone, of an outer cone, a ring connecting the two cones, and a lock nut applied to the axle spindle and having a dust cap or shield overlapping said connecting ring, substantially as set forth.

Witness my hand this 13th day of February, 1893.

EDWARD A. JONES.

Witnesses:
 JNO. J. BONNER,
 CARL F. GEYER.